(12) United States Patent
Chen et al.

(10) Patent No.: US 7,092,437 B2
(45) Date of Patent: Aug. 15, 2006

(54) METHODS AND SYSTEMS FOR DETERMINING AN OPTIMAL TRAINING INTERVAL IN A COMMUNICATIONS SYSTEM

(75) Inventors: Dongyan Chen, Durham, NC (US); Yiguang Hong, Durham, NC (US); Kishor S. Trivedi, Durham, NC (US)

(73) Assignee: Duke University, Durham, NC (US)

( * ) Notice: Subject to any disclaimer, the term of this patent is extended or adjusted under 35 U.S.C. 154(b) by 426 days.

(21) Appl. No.: 10/423,994

(22) Filed: Apr. 25, 2003

(65) Prior Publication Data

US 2004/0213361 A1 Oct. 28, 2004

(51) Int. Cl.
*H03H 7/30* (2006.01)
*H03H 7/40* (2006.01)

(52) U.S. Cl. .................................... 375/231
(58) Field of Classification Search ............... 375/229, 375/230, 231, 232, 233
See application file for complete search history.

(56) References Cited

U.S. PATENT DOCUMENTS

| | | | | |
|---|---|---|---|---|
| 4,756,007 A | * | 7/1988 | Qureshi et al. | 375/259 |
| 5,548,412 A | * | 8/1996 | Minamizawa et al. | 358/406 |
| 5,586,143 A | * | 12/1996 | Whinnett | 375/229 |
| 6,520,744 B1 | * | 2/2003 | Verbin et al. | 455/416 |
| 6,816,082 B1 | * | 11/2004 | Laborde | 340/853.3 |

OTHER PUBLICATIONS

International Search Report and Notification of Transmittal with Written Opinion dated Mar. 20, 2006.

* cited by examiner

*Primary Examiner*—Kevin Kim
(74) *Attorney, Agent, or Firm*—Jenkins, Wilson, Taylor & Hunt, P.A.

(57) ABSTRACT

Methods and Systems for Determining an Optimal Training Interval in a Communications System. A method is provided for determining an optimal training interval for a channel of a communications system. The method can include a step for receiving first channel estimations of a signal carried by a channel of a communications system, wherein the first channel estimations are generated by a first channel estimator. The communications system can include a normal mode for utilizing the channel to carry user data, a training mode for training the first channel estimator, and a failure mode for recovering channel communication after channel failure. The method can include a step for determining a time distribution of the channel transition from the normal mode to the failure mode, wherein channel failure occurs when error in the first channel estimations exceeds a first predetermined threshold. Further, the method can include a step for applying Markovian analysis to the time distribution of the channel transition to determine a first training interval such that channel utilization in the normal mode is maximized.

38 Claims, 11 Drawing Sheets

METHODS AND SYSTEMS FOR DETERMINING AN OPTIMAL TRAINING INTERVAL IN A COMMUNICATIONS SYSTEM

GRANT STATEMENT

This work was supported by grant F49620-00-1-0327 from the Air Force Office of Scientific Research and grant DAAD19-01-1-0646 from the Army Research Office. Thus, the United States Government has certain rights in the invention.

TECHNICAL FIELD

The present invention relates to systems and methods of channel equalization in a communications system. Specifically, the present invention relates to systems and methods for training a channel estimator in a wireless communications system.

BACKGROUND ART

Broadband wireless communications systems have become an integral part of the global communications infrastructure with the rapid growth in popularity of wireless data services. There remains a need for developing new techniques for better channel utilization due to the limited bandwidth resources of wireless communications systems.

In wide-band digital communications systems, modulation pulses will spread and result in inter-symbol interference (ISI) when modulation bandwidth exceeds the coherence bandwidth of the radio channel. Typically, equalization algorithms are built into the receiver to compensate for channel amplitude and delay variations and combat ISI for reducing bit error rate (BER). Generally, the equalization algorithms can be categorized into training-based equalization and blind equalization.

Receivers utilizing training-based equalization algorithms typically include channel estimators having adaptive filters. Adaptive filters include coefficient parameters that can be adjusted, or trained, in dependence upon the characteristics of a received signal. The adjustment of the filter coefficient parameters is accomplished by transmitting a known training sequence of symbols to the receiver. The adjustment of the filter coefficient parameters is effected by comparing the received symbols to the known transmitted symbols, so as to minimize the differences between the received and transmitted symbols. This adjustment is termed equalization, because it has the effect of reducing, or equalizing, the effects of those environmental sources which caused the observed errors. After the adjustment, or training, of the receiver, the transmission of message symbols can commence. The underlying assumption in this scenario is that the environmental conditions which caused differences in the received training symbols, compared to the transmitted training symbols, would affect the subsequent received message symbols as well, and, therefore, an adjustment to the filters which minimized the errors in the received training symbols would also minimize errors in the received message symbols. Typically, training-based equalization is implemented periodically due to the time-varying nature of the wireless channel.

In blind equalization algorithms, training is not needed and higher bandwidth utilization may be achieved because the channel can be fully devoted to data packet transmission. Blind equalization is more complicated than periodic training equalization, and the performance of blind equalization suffers from a slower convergence rate. On the other hand, the bandwidth utilization of periodic training equalization is lower due to the requirement of training sequences. Additionally, a careless selection of training interval can result in either redundant training sequences when the channel varies relatively slowly, or excessive packet retransmissions when the channel varies relatively fast.

Some current training-based equalization algorithms include a scheme for determining intervals for initiating a training sequence. The basic idea of the scheme is that no training sequence is transmitted until the abrupt change detection algorithm detects changes in channel parameters that may cause an equalizer failure. In such case, the receiver requests the transmitter to transmit the training sequence to re-adjust the channel estimations at the receiver so as to recover from the failures. This scheme is known as condition-based training because the training decision is based on the channel conditions. However, this scheme is constrained by the complexity of implementation of the abrupt change detection algorithm and may be prone to performance degradation due to false and missed alarms.

Communications systems would benefit by having a scheme for determining a training decision including reduced algorithm complexity. Additionally, communications systems would benefit by having a training decision scheme that improves communication performance, specifically, channel utilization. Thus, it is desired to provide a training decision scheme having reduced complexity and improved channel utilization.

DISCLOSURE OF THE INVENTION

According to one embodiment of the present invention, a method for determining an optimal training interval for a channel of a communications system is provided. The method can include a step for receiving first channel estimations of a signal carried by a channel of a communications system, wherein the first channel estimations are generated by a first channel estimator. The communications system can include a normal mode for utilizing the channel to carry user data, a training mode for training the first channel estimator, and a failure mode for recovering channel communication after channel failure. The method can include a step for determining a time distribution of the channel transition from the normal mode to the failure mode, wherein channel failure occurs when error in the first channel estimations exceeds a first predetermined threshold. Further, the method can include a step for applying Markovian analysis to the time distribution of the channel transition to determine a first training interval such that channel utilization in the normal mode is maximized.

According to a second embodiment of the present invention, a method for determining an optimal training interval for a channel of a communications system is provided. The method can include a step for receiving first channel estimations of a signal carried by a channel of a communications system, wherein the first channel estimations are generated by a first channel estimator. The communications system can include a normal mode for utilizing the channel to carry user data, a training mode for training the first channel estimator, and failure mode for recovering channel communication after channel failure. The method can include a step for receiving second channel estimations of the signal from a second channel estimator, wherein the second channel estimator is not trained in the training mode. Further, the method can include a step for determining a time distribution of the channel transition from the normal mode to the failure mode, wherein channel failure occurs when error between the first and second channel estimations a first predetermined threshold. The method can also include a step for applying Markovian analysis to the time distribution of the channel transition to determine a first training interval such that channel utilization in the normal mode is maximized.

According to a third embodiment of the present invention, a method for determining an optimal training interval for a channel of a communications system is provided. The method can include a step for a first channel estimator connected to a channel of a communications system for generating first channel estimations of a signal carried by the channel, wherein the first channel estimations are generated by a first channel estimator. The communications system can include a normal mode for utilizing the channel to carry user data, a training mode for training a first channel estimator, and a failure mode for recovering channel communication after channel failure. The method can include a step for determining a failure time distribution of the channel transition from the normal mode to the failure mode, wherein the channel failure occurs when error in the first channel estimations exceeds a first predetermined threshold, wherein the failure time distribution includes a predetermined number n of channel failure times. Further, the method can include a step for determining a scaled total time on test statistic with the following equation:

$$\Phi_j = \sum_{k=1}^{j} x_k + (n-j)x_j,$$

wherein n represents the predetermined number of channel failure times, k represents the position of the failure time in an ordered sequence, and $x_k$ represents the kth smallest failure time in the ordered sequence. The method can also include a step for determining a first training interval with the following equation:

$$x_j = \max\left\{ j \,\Big|\, \max_{0 \le j \le n} \frac{\phi_{nj}}{j/n + t_1/t_2} \right\},$$

wherein $x_j$ converges to the first training interval as n goes to infinity, $t_1$ represents a first time period required for training the first channel estimator in the training mode, and $t_2$ represents a second time period required for recovering channel communication in the failure mode.

According to a fourth embodiment of the present invention, a system for determining an optimal training interval for a channel of a communications system is provided. The system can include a first channel estimator connected to a channel of a communications system for generating first channel estimations of a signal carried by the channel, wherein the first channel estimations are generated by a first channel estimator. The communications system can include a normal mode for utilizing the channel to carry user data, a training mode for training a first channel estimator, and a failure mode for recovering channel communication after channel failure. The system can also include a mode monitor for determining time distribution of the channel transition from the normal mode to the failure mode, wherein channel failure occurs when error in the first channel estimations exceed a first predetermined threshold. The system can include a training interval estimator for applying Markovian analysis to the time distribution of the channel transition to determine a first training interval such that channel utilization in the normal mode is maximized.

According to a fifth embodiment of the present invention, a computer-readable medium having stored thereon instructions for determining an optimal training interval for a channel of a communications system is provided. The computer-readable medium can include receiving first channel estimations of a signal carried by a channel of a communications system, wherein the first channel estimations are generated by a first channel estimator. The communications system can include a normal mode for utilizing the channel to carry user data, a training mode for training the first channel estimator, and a failure mode for recovering channel communication after channel failure. The computer-readable medium can include determining a time distribution of the channel transition from the normal mode to the failure mode, wherein channel failure occurs when error in the first channel estimations exceeds a first predetermined threshold. The computer-readable medium can include applying Markovian analysis to the time distribution of the channel transition to determine a first training interval such that channel utilization in the normal mode is maximized.

Accordingly, it is an object of the present invention to provide methods and systems for determining an optimal training interval for a channel of a communications system.

It is another object of the present invention to provide a training decision scheme that improves communication performance, specifically, channel utilization.

Some of the objects of the invention having been stated hereinabove, other objects will become evident as the description proceeds when taken in connection with the accompanying drawings as best described hereinbelow.

BRIEF DESCRIPTION OF THE DRAWINGS

Exemplary embodiments of the invention will now be explained with reference to the accompanying drawings, of which.

DETAILED DESCRIPTION OF THE INVENTION

In accordance with the present invention, methods and systems are provided for determining an optimal training interval in a communications system. The methods and systems according to the present invention will be explained in the context of flow charts and diagrams. It is understood according to this invention that the flow charts and diagrams can be implemented in hardware, software, or a combination of hardware and software. Thus, the present invention can include computer program products comprising computer-executable instructions embodied in computer-readable media for performing the steps illustrated in each of the flow charts or implementing the machines illustrated in each of the diagrams. In one embodiment of the present invention, the hardware and software for determining an optimal training interval is located in a receiver of a communications system. Alternatively, the hardware and software for determining an optimal training interval can be located in a transmitter or other component of a communications system.

Figure 1A:
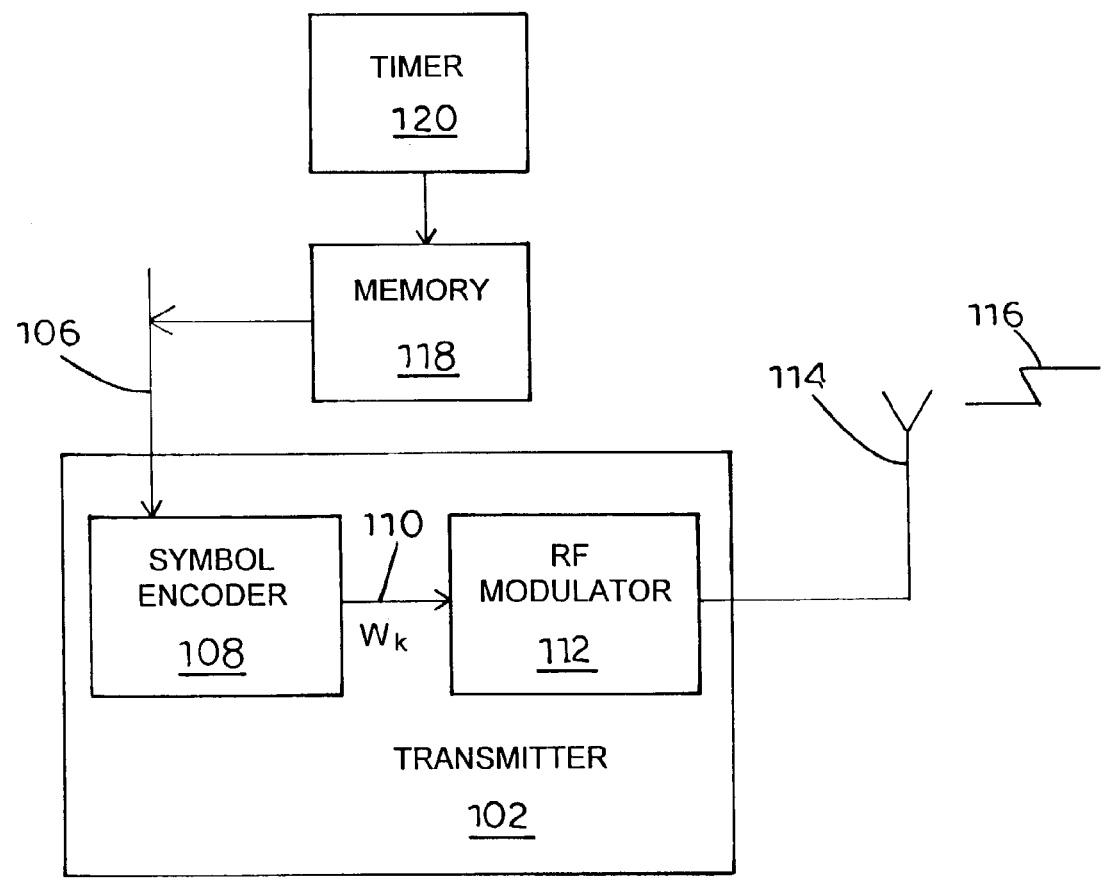
FIGS. 1A and 1B are a schematic view of an exemplary wireless communications system including a transmitter and receiver.
Figure 1B:
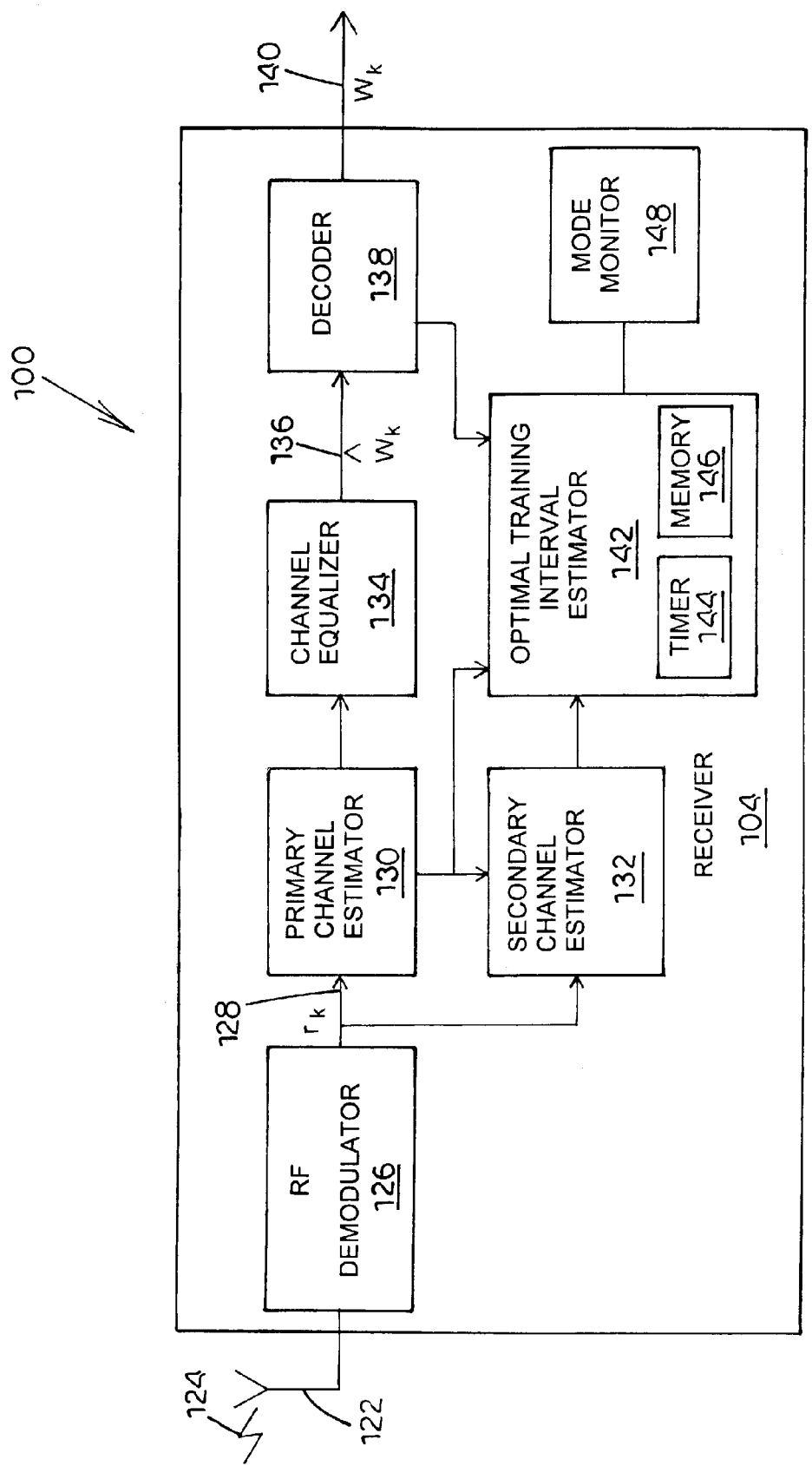

Referring to FIGS. 1A and 1B, an exemplary wireless communications system, generally designated 100, is illustrated including a transmitter 102 and a receiver 104. Transmitter 102 and receiver 104 can be a part of a communications device such as a mobile telephone, a base station, a computer system, digital satellite receivers, or any other device requiring a communications channel in a wireless communications system. Wireless communications system 100 utilizes radio frequency (RF) communication for transmitting signals between transmitter 102 and receiver 104 on a communications channel. Alternatively, the media and means for transmitting a signal between transmitter 102 and receiver 104 can be any method, such as cable, fiber optic, or infrared. Environmental elements such as buildings, hills, and cars (not shown) can affect the signal transmission between transmitter 102 and receiver 104. Additionally, transmitting media and means can have different environmental factors affecting the communications between transmitter 102 and receiver 104.

Transmitter 102 can receive information 106 from the other components in a wireless communications device for wireless transmission to receiver 104. Information 106 is provided to a symbol encoder 108, which produces message symbols $w_k$ 110, sequentially in time. The message symbols are represented by $w_k$, wherein k is the k-th time interval in the transmission series. The symbols $w_k$ 110 are formed from a discrete set of values in accordance with known encoding techniques. The discrete set of values can be, for example, an 8-level encoding set comprising the values −7, −5, −3, −1, 1, 3, 5, and 7. The set of encoding values utilized in a particular communications system is termed the constellation of the encoding scheme. It is the encoding which produces the long-term characteristics of the transmission sequence. By limiting the values of the encoding to a particular constellation, and controlling the method of encoding, long term characteristics such as an equal likelihood of occurrence of each of the values in the constellation can be maintained. The encoded symbols $w_k$ 110, having these long-term characteristics, are transmitted via an RF modulator 112 and antenna 114 as transmitted signal $w_k$ 116 to receiver 104, shown in FIG. 1B.

Transmitter 102 can operate in a training mode for transmitting a known training sequence of symbols to receiver 104. Transmitter 102 can include a memory 118 for storing the known sequence of training symbols and a timer 120 for initiating the transmission of the training symbols at a training interval t for optimizing channel utilization. The training interval t can be updated by receiver 102. Antenna 114 and other receiving components are operable to receive the updated training time t from receiver 102 for updating timer 120 with the updated training interval.

Transmitted signal $w_k$ 116 is received by an antenna 122 of receiver 104 as received signal 124, as shown in FIG. 1B. Received signal 124 comprises transmitted signal $w_k$ 116 in an attenuated form and noise from other electromagnetic generators in the environment, such as RF signals from another transmitter or reflected copies of transmitted signal $w_k$ 116 from a building, which are received at different times relative to the original transmitted signal $w_k$ 116. Thus, received signal 124 can be considered an adversely filtered version of transmitted signal $w_k$ 116, with additional noise. Received signal 124 can be demodulated via an RF demodulator 126 to form a demodulated received signal $r_k$ 128.

Receiver 104 can also include a primary channel estimator 130 and a secondary channel estimator 132. As described in further detail below, primary channel estimator 130 is trained at the training interval t. Secondary channel estimator 132 is not trained. Two channel estimators 130 and 132 are required for determining an optimal training interval as described below. During a normal mode of operation, primary and secondary channel estimator 130 and 132 receives signal $r_k$ 122 and produces two channel estimations based on signal $r_k$ 122.

Receiver 104 can include a channel equalizer 134 for receiving and equalizing received signal $r_k$ 128. The symbols of received signal $r_k$ 128 are processed by channel equalizer 134 to produce a received signal $\hat{w}_k$ 136 having filtered received symbols based on channel estimations from primary channel estimator 130. The carat symbol (ˆ) is used to indicate that this symbol is a channel estimate of transmitted signal $w_k$ 110. Decoding and decision logic unit (decoder) 138 can receive and decode symbol $\hat{w}_k$ 136 to produce output information 140, which, ideally, is identical to information 106.

Communications system 100 can include the following three modes of operation: (1) normal mode; (2) training mode; and (3) failure mode. During the normal mode, the channel estimations of primary channel estimator 134 are assumed to be correct and are used to track the changes in the channel. Because the condition of the considered channel is time-varying, the discrepancy between output information 140 from decoder 138 and information 106 also evolves with time. As a consequence, if the inaccuracy in estimation is not detected and corrected promptly, the erroneously decoded symbols will prevail and result in lost data packets and channel outages. To avoid such losses, primary channel estimator 130 is trained periodically in the training mode to correct its deviated channel estimations. The failure mode results from lost data packets and channel outages. In the failure mode, communications system 100 recovers channel communication after channel failure.

Figure 2:
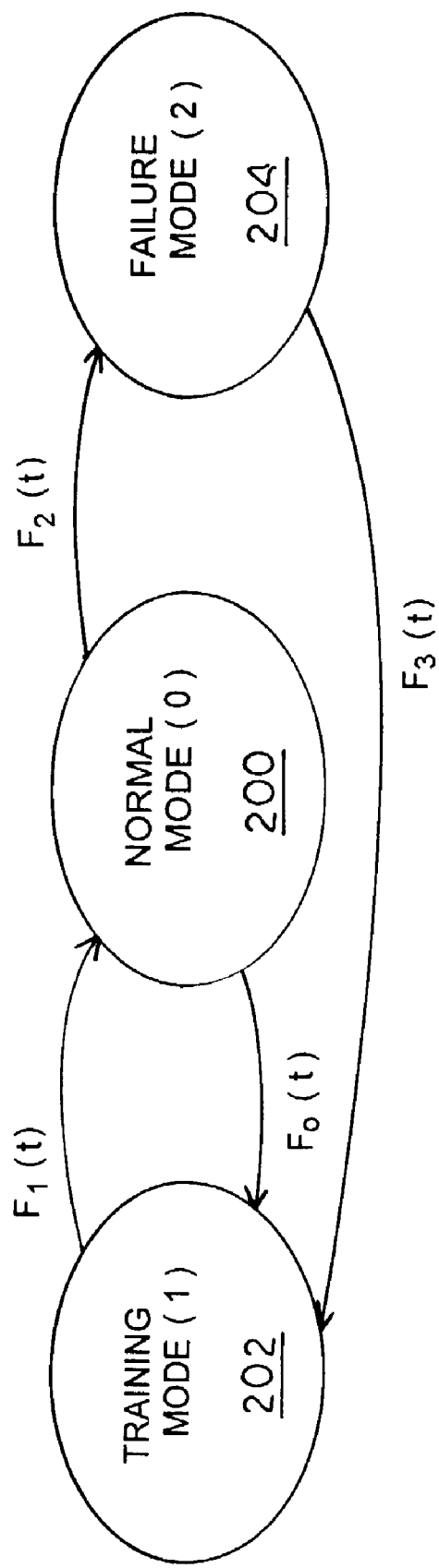
FIG. 2 is a schematic view of a state transition diagram for the operating modes of a communications system.

Referring to FIG. 2, a state transition diagram is illustrated of the operating modes and state transitions of communications system 100. As stated above, communications systems 100 can operate in one of the following modes: (1) normal mode 200; (2) training mode 202; and (3) failure mode 204. When receiver 104 operates in training mode 202, transmitter 102 transmits the known sequence of training symbols from memory 118 to receiver 104 for training primary channel estimator 130. As stated above, the training symbols are transmitted and training mode 202 entered at the optimal training interval. When operating in normal mode 200, the estimated channel parameters from primary channel estimator 130 are used by channel estimator 134 to compensate for the inter-symbol interference (ISI) in received signal $r_k$ 128 for retrieving the originally transmitted signal $w_k$ 110.

In all modes 200, 202, and 204, secondary channel estimator 132 receives signal $r_k$ 128 for estimating channel parameters. The estimated channel parameters output from secondary channel estimator 132 are compared with the estimated channel parameters of primary channel estimator 130 for determining an optimal training interval. When an estimation failure is detected, the failure time is reported to an optimal training interval estimator 142 and the channel parameters of secondary channel estimator 132 are set to the channel parameters of primary channel estimator 130. Secondary channel estimator 132 can estimate the channel failure time distribution, which can be used to calculate an optimal training interval. Secondary channel estimator 132 can operate without periodic training and produce output for comparison to primary channel estimator 130 to obtain estimation failure time for primary channel estimator 130. This failure time can be used to subsequently estimate the channel failure time distribution and to estimate the optimal interval.

The optimal training interval is estimated by training interval estimator 142, as described in more detail below. Estimator 142 can include a timer 144 for tracking equalization failure times and a memory 146 for storing equalization failure times. The updated training interval can then be transmitted to memory 118 for updating the training interval. Receiver 104 can include a mode monitor 148 to determine the time distribution of the channel transition of system 100 from normal mode 200 to failure mode 204 for applying semi-Markovian analysis for determining the optimal training interval, as described in further detail below. Training interval estimator 142 applies semi-Markovian analysis to the time distribution of the channel transition to determine a training interval such that channel utilization in normal mode 200 is maximized.

During normal mode 200, decoder 138 receives the output from channel equalizer 134 for determining originally sent symbols $w_k$ 110 and outputting the determined symbols as decoded symbols $w_k$ 140. Symbols $w_k$ 140 from decoder 138 are used by primary channel estimator 130 to track channel changes. Channel changes can be tracked by the standard channel estimation algorithm contained in adaptive filters. Exemplary algorithms include recursive least squares (RLS) algorithm or Kalman algorithm. Symbols $w_k$ 140 are not always error free. Erroneous symbols $w_k$ 140 can introduce errors into primary channel estimator 130 and result in false failure time measurements. In this case, assuming that certain error control coding technique is applied and an unrecoverable error in symbols $w_k$ 140 can be detected, channel estimation failure can be identified and signaled to training interval estimator 142 by decoder 138 when BER exceeds a tolerable threshold. System 100 can enter failure mode 204 when excessive BER is detected.

Optimal Training Interval Estimation

Figure 3:
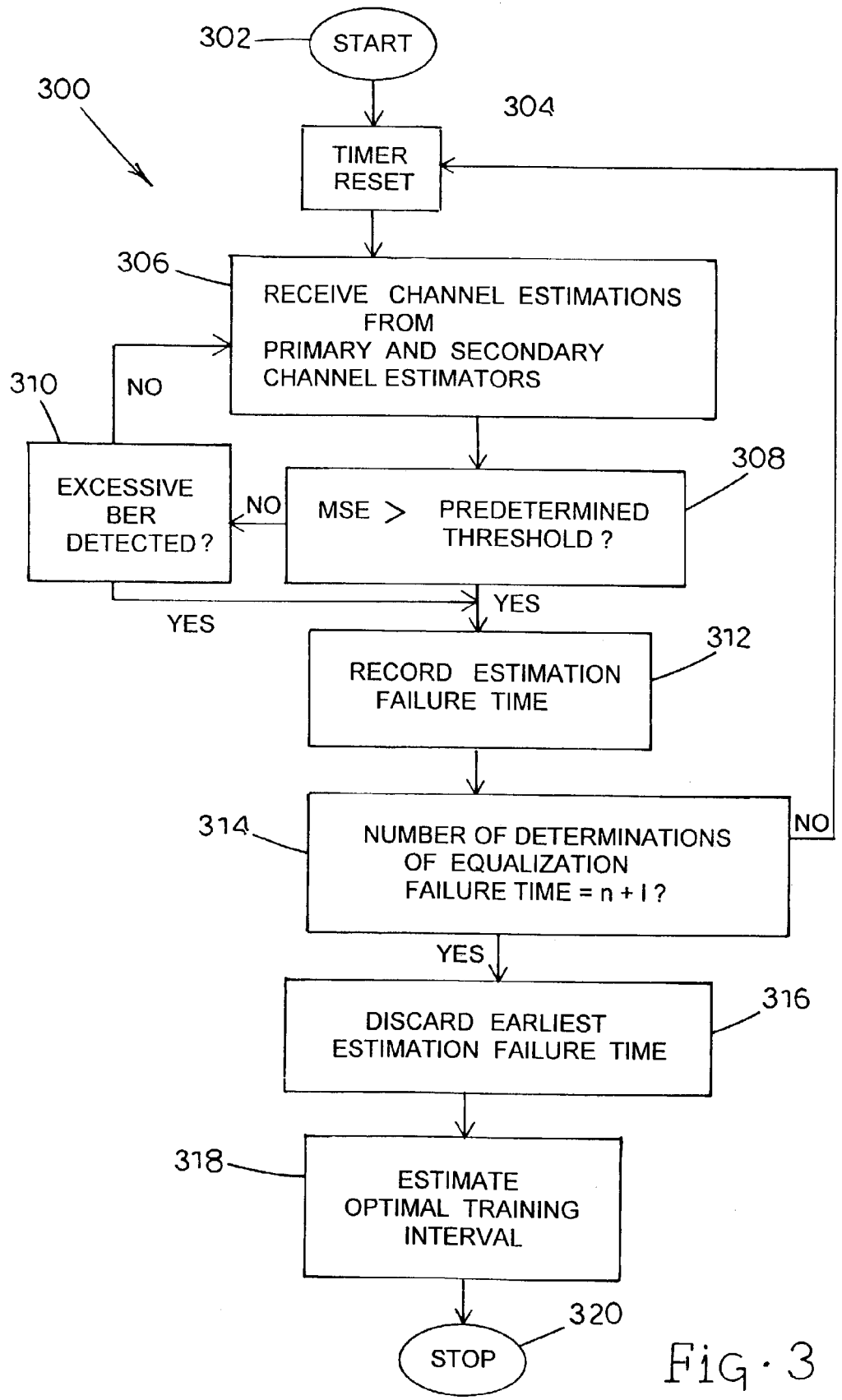
FIG. 3 is a flow chart illustrating a process for optimal training interval estimation for one embodiment of the present invention.

A method for estimating an optimal training interval for a communication channel of a receiver includes maximizing channel utilization based on the equalization failure time distribution of the communication channel. Referring to FIG. 3, a flow chart 300 is provided which illustrates a process for optimal training interval estimation according to an embodiment of the present invention. As stated above, such optimal training interval estimation can be performed by training interval estimator 142. The process begins at the step indicated by reference numeral 302. At the beginning of the process, timer 144 is reset to zero (step 304). Next, the process executes a routine for determining channel equalization failure. As described in further detail below, the routine is executed for a predetermined number of times n to determine an equalization failure time distribution of the communication channel. Timer 144 is reset after each channel equalization failure for tracking the time until the next occurrence of channel equalization failure.

In one embodiment, channel equalization failure is determined when either (1) the mean squared error (MSE) of the channel estimations of primary and secondary channel estimators 130 and 132 is greater than a predetermined threshold; or (2) decoder 138 indicates that the bit error rate (BER) is excessive. Alternatively, equalization failure time can be detected by comparing symbols before the decision logic and determining mean squared error (MSE). The "loop" shown in steps 306, 308, and 310 executes until a channel equalization failure is determined. In step 306, estimator 142 receives channel estimations from primary and secondary channel estimators 130 and 132. Based on the channel estimations from channel estimators 130 and 132, the mean squared error (MSE) is determined and compared to a predetermined threshold (step 308). Preferably, the predetermined threshold is between 0.01 and 0.0001. MSE is determined by the following equation (wherein $J_k$ represents MSE, $f_k$ represents the channel estimations when receiving the kth symbol from secondary channel estimator 132, and f represents the channel estimations when receiving the kth symbols from primary channel estimator 130):

$$J_k = (f_k - f_k)^T (f_k - f_k)$$

If the MSE ($J_k$) is greater than the predetermined threshold $J_{th}$, the time on timer 144 is recorded in a time array in memory 146 for indicating a channel equalization failure time (step 312).

If it is determined that MSE ($J_k$) is not greater than the predetermined threshold ($J_{th}$), estimator 142 determines whether excessive BER is detected (step 310). Decoder 138 can detect BER and transmit a signal to estimator 142 indicating whether excessive BER is detected. BER can be determined through channel coding. Generally, in channel coding, source information is coded and some redundant information is inserted so that if one bit is in error, the original information can still be recovered. If BER is greater than a predetermined threshold, the time on timer 144 is recorded in the array in memory 146 for indicating a channel equalization failure time (step 312).

Next, at step 314, it is determined whether the number of determinations of equalization failure time equals the predetermined number n+1. If the number of determinations equals a predetermined number n (between approximately 50 and 100)+1, the first recorded of equalization failure time is discarded (step 316). The earliest equalization failure time is discarded because it can be unknown when timer 144 was initially reset to determine the earliest failure time, which can result in erroneous data. Next, the process goes to step 318. If the number of determinations of equalization failure times does not equal the predetermined number n+1, the process goes to step 304 for initiating the collection of an additional equalization failure time.

At step 318, an optimal training time interval is determined based on the previously recorded n determinations of channel estimation failure times. First, the estimation failure times are placed in ascending order in an array. Next, a scaled total time on test (TTT) statistic is determined by the following equation (wherein n represents the number of observations, k represents the position of the failure time observation in the array, and $x_k$ represents the kth smallest failure time in the array):

$$\Phi_j = \sum_{k=1}^{j} x_k + (n-j)x_j$$

Next, a non-parametric estimator of the optimal training interval $t^*_0$ is given by the following equation:

$$x_{j*} = \max\left\{ j \,\middle|\, \max_{0 \le j \le n} \frac{\phi_{nj}}{j/n + t_1/t_3} \right\}$$

$x_{j*}$ converges to the optimal training time interval with probability one as n goes to infinity. $t_1$ represents an estimated time required for training primary channel estimator 130. $t_3$ represents an estimated time required for recovering channel communication in failure mode 204. The optimal training time interval can be transmitted to transmitter 102 for setting a new training time interval in memory 118. The process can then stop (step 320). Alternatively, the process can go to step 304 for determining another optimal training interval.

Model Description

The methods for determining an optimal training interval are derived from the equalization failure time distribution such that channel utilization is maximized. A closed-form expression for the optimal training interval is derived via a semi-Markov process (SMP) which requires knowledge of the channel equalization failure time distribution. A Markov process is described in *Modeling and Analysis of Stochastic Systems*, by M. Basseville and I. V. Nikiforov, Chapman & Hall (1995), which is herein incorporated by reference. The expression for the optimal training interval is also based on a discrete-time white noise channel model.

Figure 4:
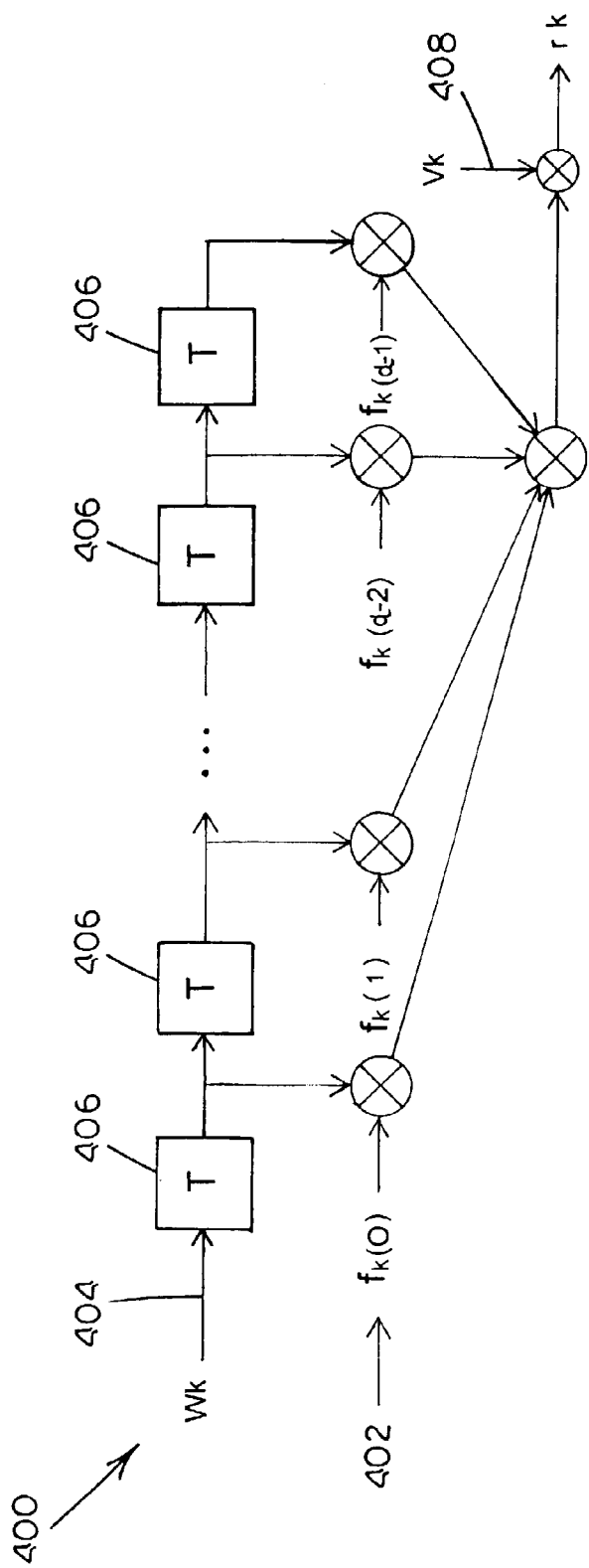
FIG. 4 is a mathematical diagram illustrating an equivalent discrete-time channel model for the study of equalization algorithms.

Referring to FIG. 4, a mathematical diagram for an equivalent discrete-time channel model, generally designated 400, for the study of equalization algorithms is illustrated. In model 400, $f_k(i)$, generally designated 402, represents the ith channel tap coefficient when receiving the kth symbol of received signal $r_k$ 128, $w_k$ 404 represents the originally transmitted message symbol. T 406 represents the time delay, and $v_k$ 408 represents noise. Based on model 400, received signal $r_k$ 120 can be written as follows (wherein $w_k = (w_k, w_{k-1}, \ldots, w_{k-q+1})^T$ and $f_k = (f_k(0), f_k(1), \ldots, f_k(q-1))^T$):

$$r_k = \sum_{i=0}^{q-1} f_k(i) w_{k-i} + v_k = f_k^T w_k + v_k$$

Because the condition of the considered communications channel of communications system 100 is time-varying, the discrepancy between the channel estimation and the real channel also varies with time. As stated above, primary channel estimator 130 is trained periodically to correct deviated channel estimations. Referring again to FIG. 2, communications system 100 can operate in normal mode 200, training mode 202, or failure mode 204. When operating in normal mode 200, communications system 100 can enter training mode 202 with a general distribution function $F_0(t)$, or enter failure mode 204 due to excessive channel estimation errors with a distribution function $F_2(t)$. The distribution function for the duration of training is $F_1(t)$. When receiver 104 is operating in failure mode 204, transmitter 102 can experience a delay in noticing transmission failure by either a negative acknowledgement or a timeout event. In this model, this delay has a distribution function $F_3(t)$. After the delay, transmitter 102 transmits a training sequence to reestablish the communication. Therefore, as shown in FIG. 2, receiver 104 enters training mode 202 after failure mode 204. The distribution function $F_1(t)$ and $F_3(t)$ can be determined by mode monitor 148.

It is assumed that the training interval between two consecutive training triggers is represented by $t_0$. Then, $F_0(t)=U(t-t_0)$, wherein $U(\cdot)$ is the unit step function. The duration for each training interval is generally distributed with mean $t_1$, and the time required to recover from the equalization failure is assumed to be generally distributed with mean time $t_3$. Similarly, the mean channel estimation failure time is assumed to be time $t_2$. Since each mode is represented by a regenerative state in the state transition diagram, the underlying stochastic process is a semi-Markov process (SMP).

Herein, channel utilization is defined as the goodput divided by the channel capacity, wherein the goodput is the amount of valid user data retrieved by the receiver in a unit time. In this embodiment, it is only in normal mode 200 that data can be received with negligible errors. Assuming the channel capacity is a constant C, the steady-state channel utilization can then be written as:

$$A(t_0) = \frac{C\pi_0}{C} = \pi_0$$

$\pi_0$ represents the steady-state probability that receiver 104 is in normal mode 200.

The kernal matrix can be represented with the following:

$$K(t) = \begin{pmatrix} 0 & k_{01}(t) & k_{02}(t) \\ k_{10}(t) & 0 & 0 \\ 0 & k_{21}(t) & 0 \end{pmatrix}$$

The $k_{01}(t)$ non-zero element of K(t) can be derived as follows:

$$k_{01}(t) = \Pr\{\text{Training is triggered before channel estimation failure by time } t\}$$

$$= \int_0^t \overline{F}_2(x) dF_0(x)$$

$$= \overline{F}(t_0) U(t - t_0)$$

The equation $\overline{F}_0(t)=1-F_i(t)$ is the complementary distribution function for any $i \in \{0, 1, 2, 3\}$.

The $k_{02}(t)$ non-zero element of $K(t)$ can be derived as follows:

$$k_{02}(t) = \Pr\{\text{Channel estimation failure occurs before the training is triggered by time } t\}$$

$$= \int_0^t \overline{F}_0(x) dF_2(x)$$

$$= \begin{cases} F_2(t) & t \leq t_0 \\ F_2(t) & t > t_0 \end{cases}$$

Additionally, the $k_{10}(t)$ non-zero element can be derived as follows:

$$k_{10}(t) = \Pr\{\text{Training completes by time } t\}$$

$$= F_1(t)$$

Furthermore, the $k_{21}(t)$ non-zero element can be derived as follows:

$$k_{21}(t) = \Pr\{\text{Channel estimation failure recovered by time } t\}$$

$$= F_3(t)$$

If the equation $P = \lim_{t \to \infty} K(t)$ is the one step transition probability matrix of the embedded Markov chain (EMC) of the SMP, then a matrix results as follows:

$$P = \begin{pmatrix} 0 & p_{01} & p_{02} \\ p_{10} & 0 & 0 \\ 0 & p_{21} & 0 \end{pmatrix}$$

Related to the matrix, the following equations result:

$P_{01} = \overline{F}_2(t_0)$ $P_{02} = F_2(t_0)$ $P_{10} = 1$ $P_{21} = 1$

Solving the EMC steady-state equations $v = vP$ and $\Sigma_{i=0}^2 v_i = 1$, the following equations are obtained:

$$v_0 = v_1 = \frac{1}{2 + F_2(t_0)}$$

$$v_2 = \frac{F_2(t_0)}{2 + F_2(t_0)}$$

The expected sojourn time in normal mode 200 can be expressed in the following equation:

$$h_0(t_0) = \int_0^\infty \overline{F}_0(t)\overline{F}_2(t) dt = \int_0^{t_0} \overline{F}_0(t) dt,$$

The expected sojourn time in training mode 202 can be expressed as $h_1 = t_1$.

The expected sojourn time in failure mode 204 can be expressed as $h_2 = t_3$.

The steady-state probability of each SMP state can therefore expressed as follows:

$$\pi_i = \frac{v_i h_i}{\sum_{m=0}^2 v_m h_m}, \quad i = 0, 1, 2$$

Next, the steady-state channel utilization can be obtained from the following equation:

$$A(t_0) = \pi_0 = \frac{\int_0^{t_0} \overline{F}_2(t) dt}{\int_0^{t_0} \overline{F}_2(t) dt + t_1 + F_2(t_0) t_3} = \frac{h_0(t_0)}{T(t_0)}$$

By taking the derivative of $A(t_0)$ with respect to $t_0$, we have:

$$\frac{dA(t_0)}{dt_0} = \frac{q(t_0)\overline{F}(t_0)}{T^2(t_0)}$$

wherein $q(t_0) = T(t_0) - [1 + t_3 r_f(t_0)] h_0(t_0)$ and $$r_f(t_0) = \frac{dF_2(t_0)/dt_0}{\overline{F}_2(t_0)} \geq 0$$

is the failure rate. Since by definition, preventive maintenance is always taken before the system fails, which means $\overline{F}_2(t_0)$ is always larger than 0, the system failure rate $r_f(t_0)$ therefore exists.

The expression for the optimal training interval is further obtained by applying the following theorem: If $q(\infty) < 0$ or $$r_f(\infty) > \frac{1}{1 + t_3 r_f(t'_0)},$$

then there is a finite optimal training interval $t'_0$ satisfying $q(t'_0) = 0$, and its local maximal channel utilization can be taken as follows:

$$A(t'_0) = \frac{1}{1 + t_3 r_f(t'_0)}$$

This theorem is referred to hereinafter as theorem 1 and is based on the existence and uniqueness of the optimal training interval. The theorem is supported by work described in *Estimating Software Rejuvenation Schedules in High-Assurance Systems*, published in IEEE Transactions on Communications, 43(2/3/4), which is incorporated herein by reference.

Moreover, if the channel failure time distribution is IFR (increasing failure rate), i.e., $$\frac{dr_f(t)}{dt} \geq 0,$$

then there is a finite and unique optimal training interval $t^*_0$ such that $t^*_0 = \sup\{t_0 | q(t_0) = 0\}$, and the maximal channel utilization can be provided by the following equation:

$$A(\infty) = \frac{t_2}{1 + t_3 r_f(t^*_0)}$$

In addition, if $$\frac{dr_f}{dt_0} \neq 0$$

at $t_0 = t^*_0$, then $t^*_0$ is the only element in the set $\{t_0 | q(t_0) = 0\}$. For the equalization problem, resulting from the error propagation in the equalization algorithm and the time-varying nature of the channel, it is reasonable to assume that the channel estimation errors accrue with time, which leads to the IFR failure time distribution. Generally, the longer interval is preferred since the system operational cost decreases with the increase of training intervals.

Furthermore, Theorem 1 provides: If $q(\infty) \geq 0$ and the channel failure time distribution is IFR, then the optimal interval is $t^*_0 \to \infty$, and the following equation is obtained:

$$A(\infty) = \frac{t_2}{t_1 + t_2 + t_3}$$

Regarding the proof for Theorem 1, it is noted that setting $dA(t_0) = 0$ implies $q(t_0) = 0$. It is also noted that $q(0) = t_1 > 0$. If $q(\infty) < 0$, there is a finite optimal training interval $t'_0$ such that:

$$q(t'_0) = 0 \text{ and } \left. \frac{dq(t_0)}{dt_0} \right|_{t_0 = t'_0} \leq 0$$

These equations imply that $A(t'_0)$ is a local maximal value. Otherwise, $q(\infty) = 0$ if $t'_0 = \infty$, or $q(\infty) > 0$ if there is no $t'_0$ satisfying the above equation, which will lead to contradictions.

Furthermore, when the failure time distribution is IFR (i.e., $r_f(t_0)$ is not decreasing), the following equation is obtained:

$$\frac{dq(t_0)}{dt_0} = -\frac{dr_f(t_0)}{dt_0} t_3 h(t_0) \leq 0$$

This equation implies that $q(t_0)$ is non-increasing and $A(t_0)$ is concave in $t_0$. Therefore, there is still a finite $t'_0$ such that $A(t'_0)$ ($q(t'_0) = 0$) is a local maximal value for an optimal training interval and also the set $\{t_0 | q(t_0) = 0$ is simply-connected. This implies that all the values of $A(t_0)$ with $t_0$ taken in the set are the same and therefore $A(t^*_0)$ is the global maximal value, with taking $t^*_0 = \sup\{t_0 | q(t_0) = 0\}$. Moreover, with $$\frac{dr_f}{dt_0} \neq 0$$

at $t_0 = t^*_0$, this $t^*_0$ is the unique solution of $q(t^*_0) = 0$ because $q(t_0)$ is non-increasing and it is strictly decreasing at $t_0 = t^*_0$. Furthermore, if $q(\infty) \geq 0$, the optimal policy is $t^*_0 \to \infty$ based on the fact that $A(t_0)$ is increasing with respect to $t_0$.

Statistical Estimation Algorithm

Deriving the optimal training interval by Theorem 1 requires knowledge of the channel estimation failure time distribution $F_2(t)$. However, this information is generally not available a priori and must be obtained from measurements followed by statistical inference. Therefore, a statistical optimization algorithm is provided for estimating the optimal training interval during operation of communications system 100.

Two channel estimators 130 and 132 are provided in communications system 100 because an estimation failure time cannot be obtained that is larger than the re-training interval from only one channel estimator. As stated above, primary channel estimator 130 operates to provide channel estimations in normal mode 200 and is updated at the optimal training interval in training mode 202. Secondary channel estimator 132 operates to provide channel estimations and is not trained in any of modes 200, 202, and 204. In this analysis, the output of the primary channel estimator 130 is represented as real channel parameters $f_k$, and the output of secondary channel estimator 132 is represented as estimated channel parameters $\hat{f}_k$. When the MSE of the output of secondary channel estimator 132 is larger than the predetermined threshold $J_{th}$ (i.e., $J_k > J_{th}$), an estimation failure is indicated and the failure time is recorded.

This process enables the collection of channel estimation failure time data, and therefore enables the online optimization process. We provide hereinbelow the mathematical equations for determining an optimal training interval.

In this section, we assume $$\frac{dr_f}{dt} \geq 0$$

and $r_f(t)|_{t \neq 0} \neq 0$. The scaled total time on test (TTT) transform is defined in the following equation:

$$\phi(p) = (1/t_2) \int_0^{F_2^{-1}(p)} \overline{F}_2(t)dt, \ 0 \leq p \leq 1$$

TTT is described in *Total Time on Test Processes and Applications to Failure Data Analysis*, published in Reliability and Fault Tree Analysis pp. 451–481, which is incorporated herein by reference.

In normal mode 200, the communications channel is monitored continuously, and an ordered complete observation of the times when MSE is greater than a predetermined threshold $(J_k > J_{th})$ is obtained as $0 = x_0 \leq \ldots \leq x_n$. Then, the scaled TTT statistic based on this observation is defined by $\phi_{nj} = \Phi_j / \Phi_n$, wherein $$\Phi_j = \sum_{k=1}^{j} (n-k+1)(x_k - x_{k-1})$$
$$= \sum_{k=1}^{j} x_k + (n-j)x_j$$

We also use the following empirical distribution function:

$$\hat{F}_n(x) = \begin{cases} j/n & x_j \leq x < x_{j+1} \\ 1 & x_n \leq x \end{cases}$$

to play the same role of $F_2(x)$ above. In fact, by defining the equation $\hat{F}_n^{-1}(p) = \inf\{x | \hat{F}(x) > p\}$, then the following equation is obtained uniformly in p with probability one:

$$\lim_{n \to \infty, \frac{j}{n} \to p} \int_0^{\hat{F}_n^{-1}(j/n)} \overline{\hat{F}}_n(t)dt = \int_0^{F_2^{-1}(p)} \overline{F}_2(t)dt$$

A second theorem, referred to hereinafter as Theorem 2, is also applied for obtaining the expression for the optimal training interval. Theorem 2 assumes that $F_2$ is IFR (i.e., $\frac{dr_f(t)}{dt} \geq 0$)

and $r_f(t) \neq 0$ if $t \neq 0$. Obtaining the optimal training interval $t^*_0$ is equivalent to obtaining $p^*(0 \leq p^* \leq 1)$ such that $$p^* = \max\{p \mid \max_{0 \leq p \leq 1} \frac{\phi(p)}{p + t_1/t_3}\}$$

It is assumed that the optimal training interval is to be estimated from the following ordered sample size n of estimation failure times: $0 = x_0 \leq x_1 \leq \ldots \leq x_n$. The failure times are obtained from a continuous distribution $F_2$, which may be unknown. A non-parametric estimator of the optimal training interval $\hat{t}^*_0$ which maximizes $A(t_0)$ is given by $x_{j^*}$, wherein:

$$j^* = \max\{j \mid \max_{0 \leq j \leq n} \frac{\phi_{nj}}{j/n + t_1/t_3}\}$$

Moreover, $x_{j^*}$ converges to the optimal solution $t^*_0$ uniformly with probability one as $n \to \infty$, if a unique optimal schedule exists.

Regarding the proof for Theorem 2, with the given above conditions, it is apparent that $F_2(t)$ is IFR if $\phi(p)$ is concave on $p \in [0,1]$. For example, given the following equation:

$$\psi(p) = \frac{\phi(p)}{p + t_1/t_3}$$

After differentiation with respect to p and setting the resulting equation equal to zero (considering that $t_0 = F_2^{-1}(p)$, and $F_2^{-1}$ is strictly monotonically increasing when $p \neq 0$ because of the conditions), the following equation results:

$$\frac{1}{t_2 r_f(t_0)} F_2(t_0) = \frac{\int_0^{t_0} \overline{F}_2 dt}{t_2} + \frac{t_1}{t_3}$$

This equation can be found to be equivalent to $q(t_0) = 0$. It is noted that $t^*_0$ is the maximal value satisfying $q(t_0) = 0$ and $F_2$ is strictly monotonically increasing. Therefore, $p^*$, as defined above, equals $F_2(t^*_0)$.

Mean Time to Failure-Based Heuristic Scheme and the Non-Periodic Training Scheme The complexity and performance analysis of a heuristic scheme based on the mean time to failure (MTTF) and the non-periodic training scheme based on abrupt change detection algorithms is provided in this section. For MTTF-based schemes, the training interval can be chosen as MTTF/k with $k \geq 1$. The channel utilization of this scheme may be computed by the following equation (wherein $t_0$ is substituted by MTTF/k):

$$A(t_0) = \pi_0 = \frac{\int_0^{t_0} \overline{F}_2(t)dt}{\int_0^{t_0} \overline{F}_2(t)dt + t_1 + F_2(t_0)t_3} = \frac{h_0(t_0)}{T(t_0)}$$

The value of k needs to be carefully selected to maintain a high channel utilization, as will be illustrated in the numerical examples. Since only the average of the n failure time data needs to be computed, the complexity of this scheme is O(n).

Figure 5:
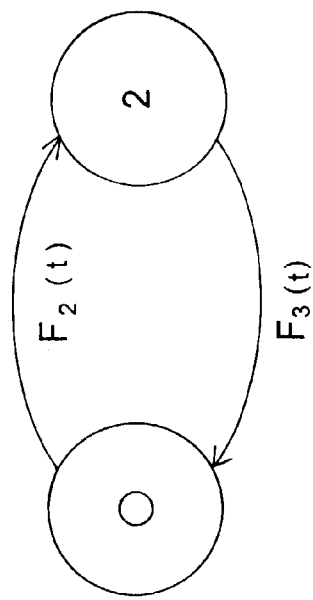
FIG. 5 is a schematic view of a state transition diagram for a non-periodic training equalizer failure/repair procedure.

For a non-periodic training scheme, the system model for the non-periodic training equalization is a two state failure/repair process because no periodic training is performed. Referring to FIG. 5, a state transition diagram is illustrated for a non-periodic training equalizer failure/repair procedure. Since the abrupt change detection algorithm is used, the non-periodic training equalizers can detect the equalization failure and send back the NACK packet at the beginning of the reception of erroneous packet. Therefore, the detection delay of non-periodic training schemes is less than that of the periodic training schemes, thus resulting in less repair time.

The steady-state channel utilization of non-periodic training equalizers can be computed with the following equation:

$$A = \frac{\int_0^\infty F_2(t)dt}{\int_0^\infty F_2(t)dt + \int_0^\infty F_2(t)dt}$$

However, the system model of FIG. 5 assumes perfect detection of equalization failure. In realistic applications, this may not be true and the abrupt change detection algorithms can be prone to false-alarms and missed alarms depending on the parameter selections and nature of changes. The abrupt change detection algorithm involves the channel change magnitude estimation and abrupt change likelihood ratio estimation. Suppose there are n channel observation samples, the complexity of the abrupt change detection algorithm is $O(n^5)$.

Numerical Results

In this section, the performance of the proposed optimal training interval through numerical examples is evaluated. The channel estimation failure time is assumed to be Weibull distributed, according to the following distribution function:

$$F_2(t) = 1 - e^{-\lambda t^\alpha}$$

Generally, Weibull distribution can be used to model component failure times. A system whose failure time follows Weibull distribution has an increasing failure rate with time, meaning that it has an accelerating failure process.

The expected sojourn time in normal mode 200 can be expressed as follows:

$$h_0 = \int_0^{t_0} e^{-\lambda t^\alpha} dt$$

$$= \frac{(\lambda)^{-1/\alpha}}{\alpha} \Gamma\left(\frac{1}{\alpha}\right) G\left(\lambda t_0^\alpha, \frac{1}{\alpha}\right)$$

In this equation, $$\Gamma(\alpha) = \int_0^{t_0} x^{\alpha-1} e^{-x} dx$$

is the gamma function, and $$G(t, \alpha) = \int_0^t x^{\alpha-1} e^{-x} dx$$

is the incomplete gamma function. Then, the channel utilization can be obtained from the following equation:

$$A(t_0) = \pi_0 = \frac{\int_0^{t_0} \overline{F}_2(t)dt}{\int_0^{t_0} \overline{F}_2(t)dt + t_1 + F_2(t_0)t_3} = \frac{h_0(t_0)}{T(t_0)}$$

First, in this example, the data transmission speed of the communication channel is 1M bit per second (bps), the length of the equalization sequence is 128 bytes, and the data frame length is 4k bytes. An erroneously received packet can be indicated by the receiver with a negative acknowledgement (NACK) packet sent to the sender, preceded by a training sequence so that the sender can correctly receive the NACK packet. The length of the NACK packet is 256 bytes. When a packet loss is detected, the transmitter transmits a training sequence, followed by a re-transmission of the data packet. A switching delay of 10 ms is introduced for this recovery process.

With the parameters selected as above, the time required for the training, $t_1$, is 0.97 milliseconds. The average time to recover the system from the failure mode must include the duration of training for NACK packet transmission, the time taken to transmit a NACK packet, the time taken to transmit the packet, and the switching delay. The time required to recover from the channel estimation failure, $t_3$, is 44 milliseconds.

The parameters for the channel estimation failure distribution are chosen as $\alpha=3$ and $\lambda=5$, resulting in a mean time to failure (MTTF) of 522 milliseconds.

A finite optimal solution exists applying Theorem 1 above and noting the following equation:

$$q(0)=t_1>0 \text{ and } q(\infty) \to -\infty$$

A. Channel Utilization of the Optimal Periodic Training Equalization

Figure 6:
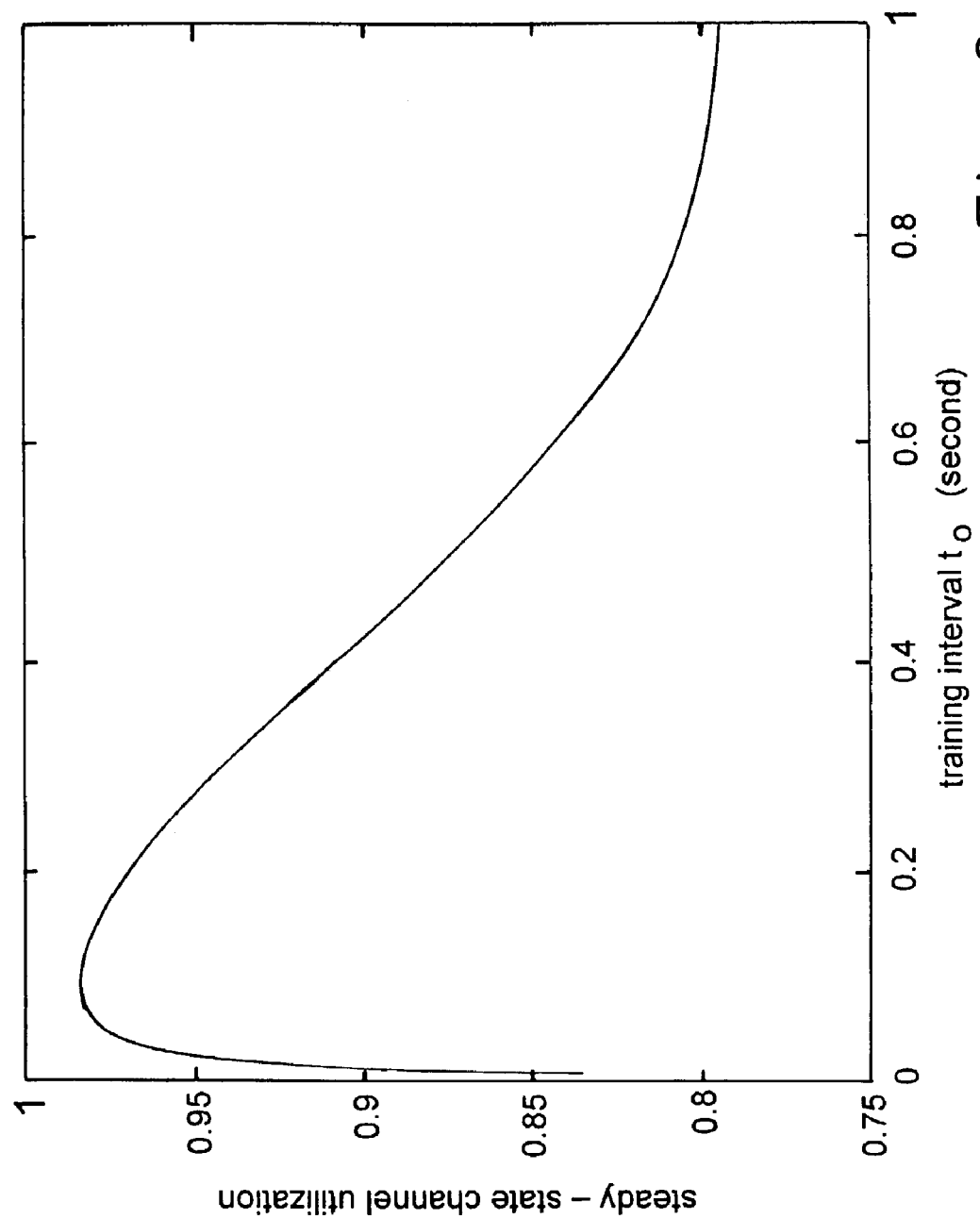
FIG. 6 is a graph illustrating the improvement on channel utilization by choosing an optimal training interval according to the present invention.

Referring to FIG. 6, a graph is shown that illustrates the improvement on channel utilization by choosing the optimal training interval $t^*_0$. This result is obtained from the closed-form expression in the following equation:

$$A(t_0) = \pi_0 = \frac{\int_0^{t_0} \overline{F}_2(t)dt}{\int_0^{t_0} \overline{F}_2(t)dt + t_1 + F_2(t_0)t_3}$$

It is noted that $A(t_0)$, with a maximal value can be obtained from the closed-form expression in this equation. According to FIG. 6, the equation can achieve a maximal value of $A^*_s=0.9839$ benefits significantly from choosing the optimal training interval, $t^*_0 \approx 90$ ms. Therefore, the optimal scheme requires that a training sequence be transmitted after 3 consecutive transmission of data frames. Compared to transmitting one training sequence before every data frame, the adaptive training method reduces two redundant training sequences and thus increases the link utilization.

Since the failure time distribution is strictly IFR (i.e., $$\left(\text{i.e., } \frac{dr_f(t_0)}{dt_0}\bigg|_{t_0=t_0^*} > 0\right),$$

the value satisfying equation $q(t_0)=0$ is unique (following Theorem 1 above). However, for example, if the failure time distribution is changed to the exponential at time $t'_0$ with $q(t'_0)=0$, then the failure rate of the distribution becomes a constant, which means there will be a time interval with any $t_0$ in it satisfying equation $q(t_0)=0$. If so, the optimal training interval is chosen as equation $t^*_0=\sup\{t_0:q(t_0)=0\}$ according to Theorem 1 based on the fact that fewer training processes imply less system cost, without changing the channel utilization.

Figure 7:
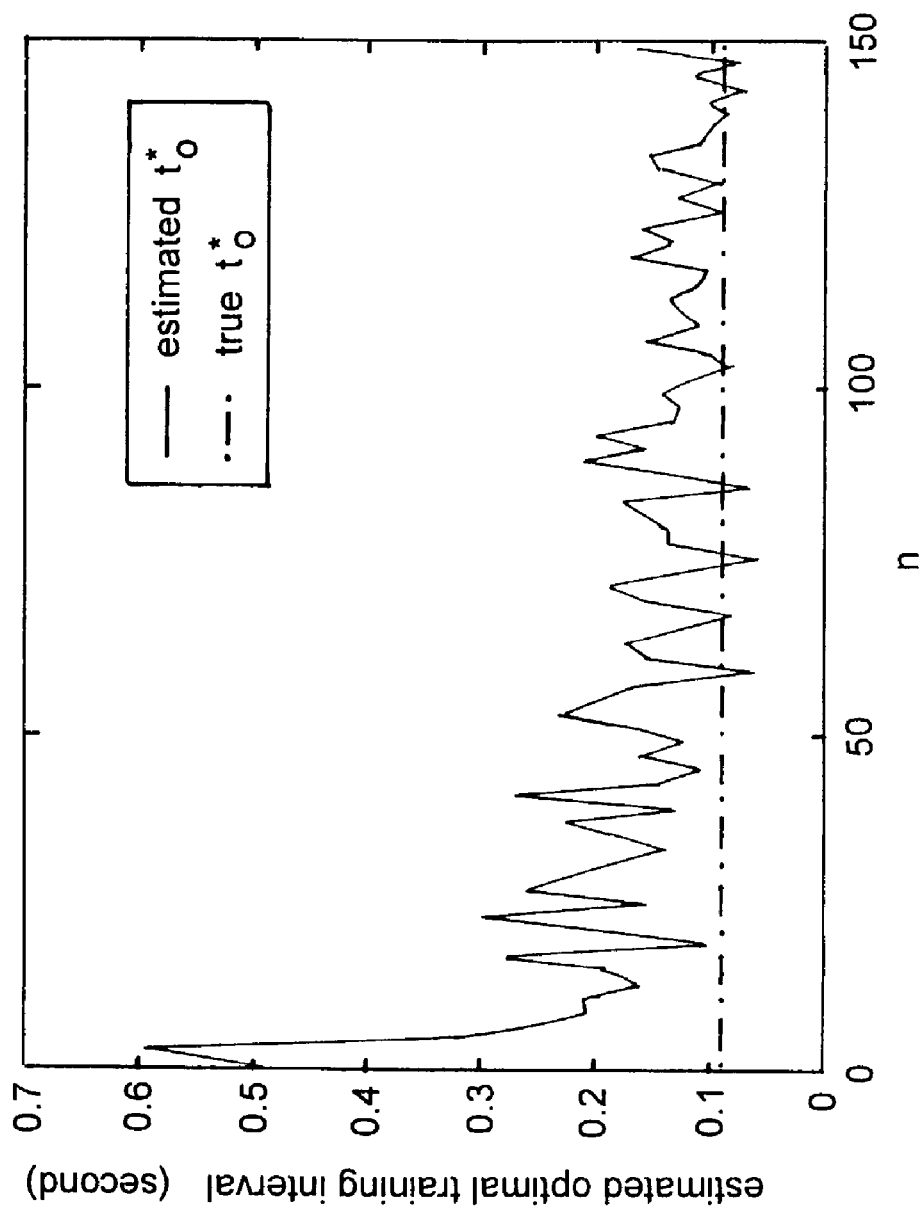
FIG. 7 is a graph illustrating the asymptotic behavior for the estimation of the optimal training interval based on TTT transform.
Figure 8:
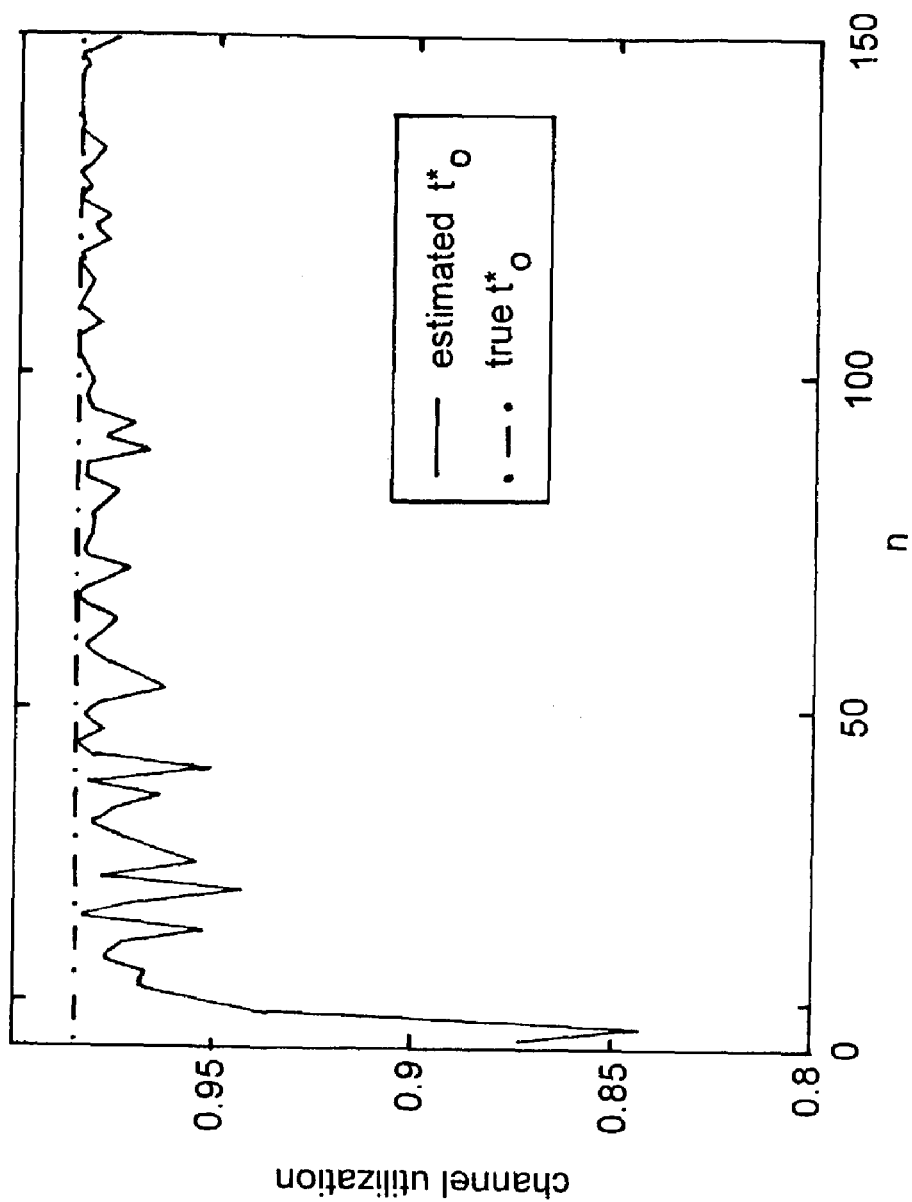
FIG. 8 is a graph illustrating the corresponding channel utilization of FIG. 7.

Referring to FIG. 7, a graph is shown that illustrates the asymptotic behavior for the estimation of the optimal training interval $t^*_0$ based on TTT transform. Additionally, referring to FIG. 8, a graph is shown that illustrates the corresponding channel utilization. For this calculation, we assume that the estimation failure time data can be obtained error-free. Based on FIGS. 7 and 8, it is noted that satisfactory results could be obtained with sample size $n \geq 30$.

Figure 9:
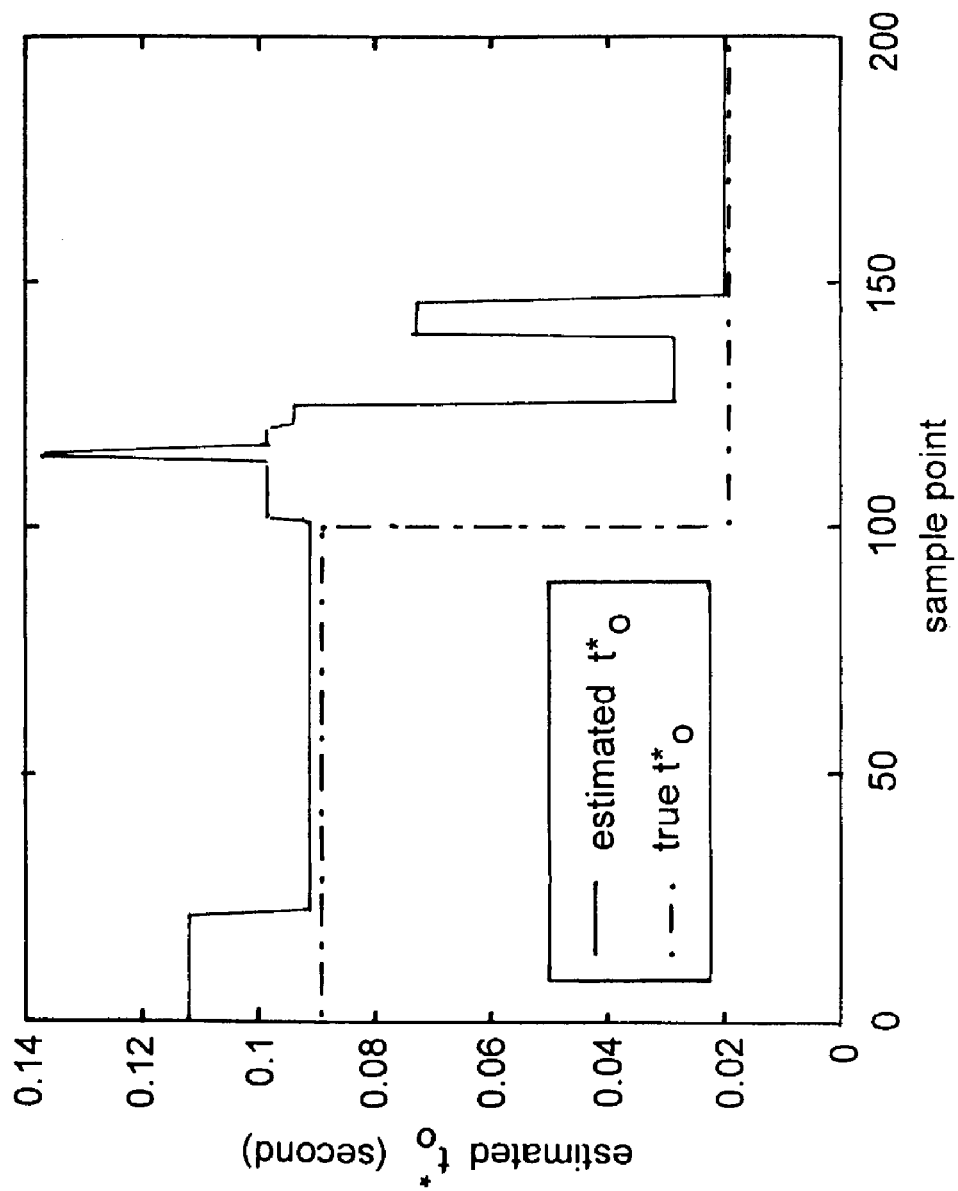
FIG. 9 is a graph illustrating the variations of the optimal training interval under abrupt change in channel failure distribution parameters.
Figure 10:
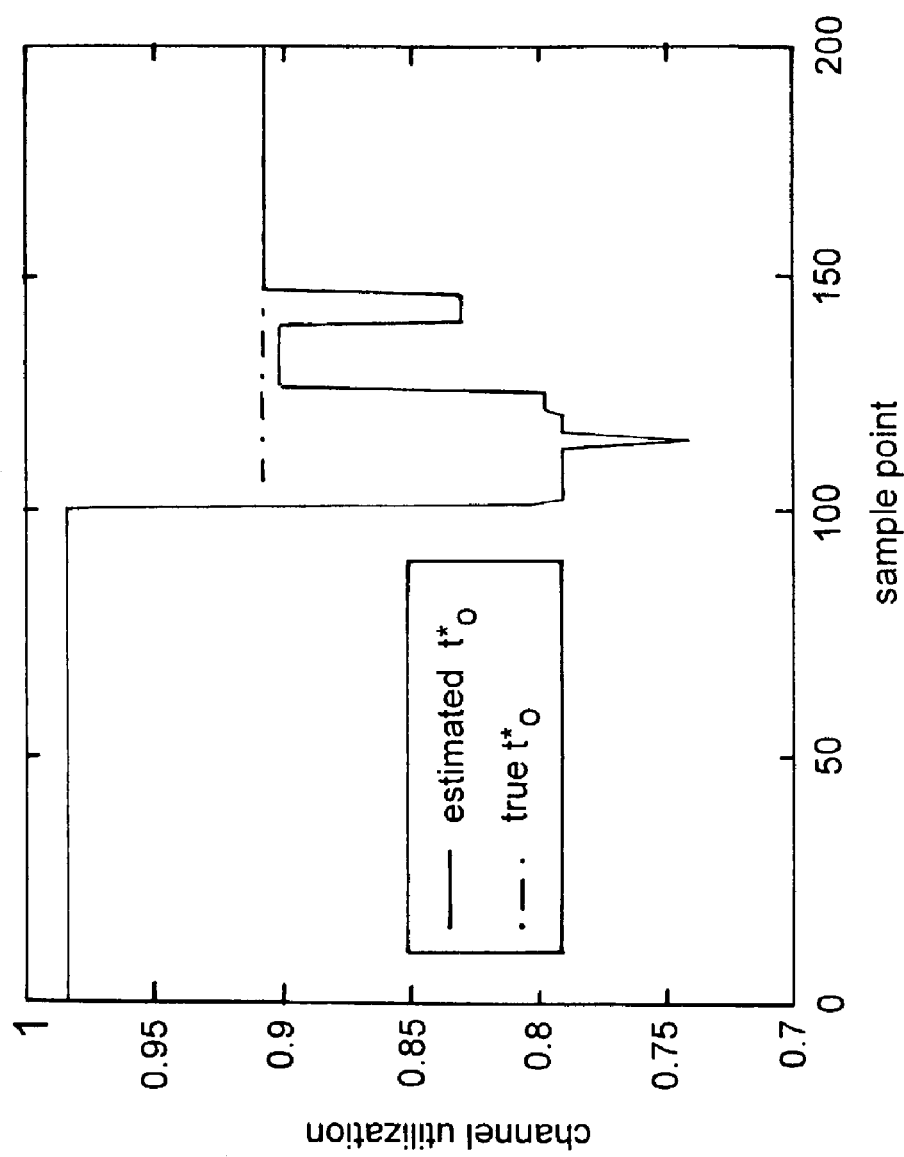
FIG. 10 is a graph illustrating the corresponding channel utilization of FIG. 9.

If the system is implemented in a mobile environment such that the receiver moves to a new environment, for example, moves to a new environment or a new noise source is added, then the considered channel failure model may change correspondingly. In this instance, the channel failure time distribution parameters can experience an abrupt change to $\alpha=2$ and $\lambda=20$. The number of data samples for the TTT transform, n, is chosen to be 40. Referring to FIG. 9, a graph is shown that illustrates the variation of $\bar{t}^*_0$ under the abrupt change in channel failure distribution parameters. Additionally, referring to FIG. 10, a graph is shown that illustrates the corresponding channel utilization. It is noted in FIGS. 9 and 10 that the estimate converges to the optimal value when more than 20 new failure time data points are collected on the new distribution parameters. It is also noted that the optimal training interval decreases from around 90 ms to around 20 ms. In this case, the training frequency can be increased from once for every 3 data packet transmissions to once for every data packet transmission. It is important to note that although the estimation error of $t^*_0$ is not negligible (as shown in FIG. 9), but since the re-training interval has to be an integer number of data packets, it is actually rounded off in the final decision of the optimal training interval. Moreover, this error may be reduced by adoption of more advanced estimation algorithms, or parametric estimation methods if some information on the failure time distribution is available beforehand.

B. Comparison with MTTF-Based Heuristic Scheme and Non-Periodic Training Scheme

For the heuristic scheme having the training interval as MTTF/k, Table 1 below shows the impact of k value on the utilization with $\alpha=1.5$, $\lambda=5$. Further, Table 2 below shows the result with $\alpha=1.5$ and $\lambda=5$. From these results, it is noted that by carefully choosing the value of k the heuristic schemes approach the maximum achievable channel utilization. For example, for $\alpha=3$ and $\lambda=5$, the optimal k is 6. Additionally, for $\alpha=1.5$ and $\lambda=5$, the optimal k is 8. However, if a general k is to be chosen to guarantee the performance of both these two cases, then its value should be 5 or 6 so that the utilization is less than 1% smaller than the maximal value. Therefore, we use k=5 for the MTTF heuristic scheme, which means that the training interval is MTTF/5.

TABLE 1

| k | UTILIZATION | PERCENTAGE (%) LESS THAN OPTIMAL UTLIZATION |
|---|---|---|
| 2 | 0.9537 | 3.07 |
| 3 | 0.9748 | 0.92 |
| 4 | 0.9814 | 0.25 |
| 5 | 0.9836 | 0.02 |
| 6 | 0.9838 | 0.01 |
| 8 | 0.8366 | 14.97 |

TABLE 2

| k | UTILIZATION | PERCENTAGE (%) LESS THAN OPTIMAL UTLIZATION |
|---|---|---|
| 2 | 0.7919 | 9.41 |
| 3 | 0.8530 | 2.43 |
| 4 | 0.8626 | 1.43 |
| 5 | 0.8682 | 0.69 |
| 6 | 0.8715 | 0.31 |
| 8 | 0.8741 | 0.01 |

For the non-periodic training schemes, it is assumed that the abrupt change detection algorithm works well with negligible detection delay and no false/missed alarms. The time to recover the system from the failure state to the operational state thus includes the duration of training for NACK packet, the time taken to transmit a NACK, switching delay, and the training time. Therefore, the recovery delay may be computed as $t'_3 = t_1 + t_1 + 10 + 0.25 * 8 * 2^{10} * 1000/2^{20} = 13.94$ ms, which is much less than the recovery delay for the training based schemes.

Figure 11:
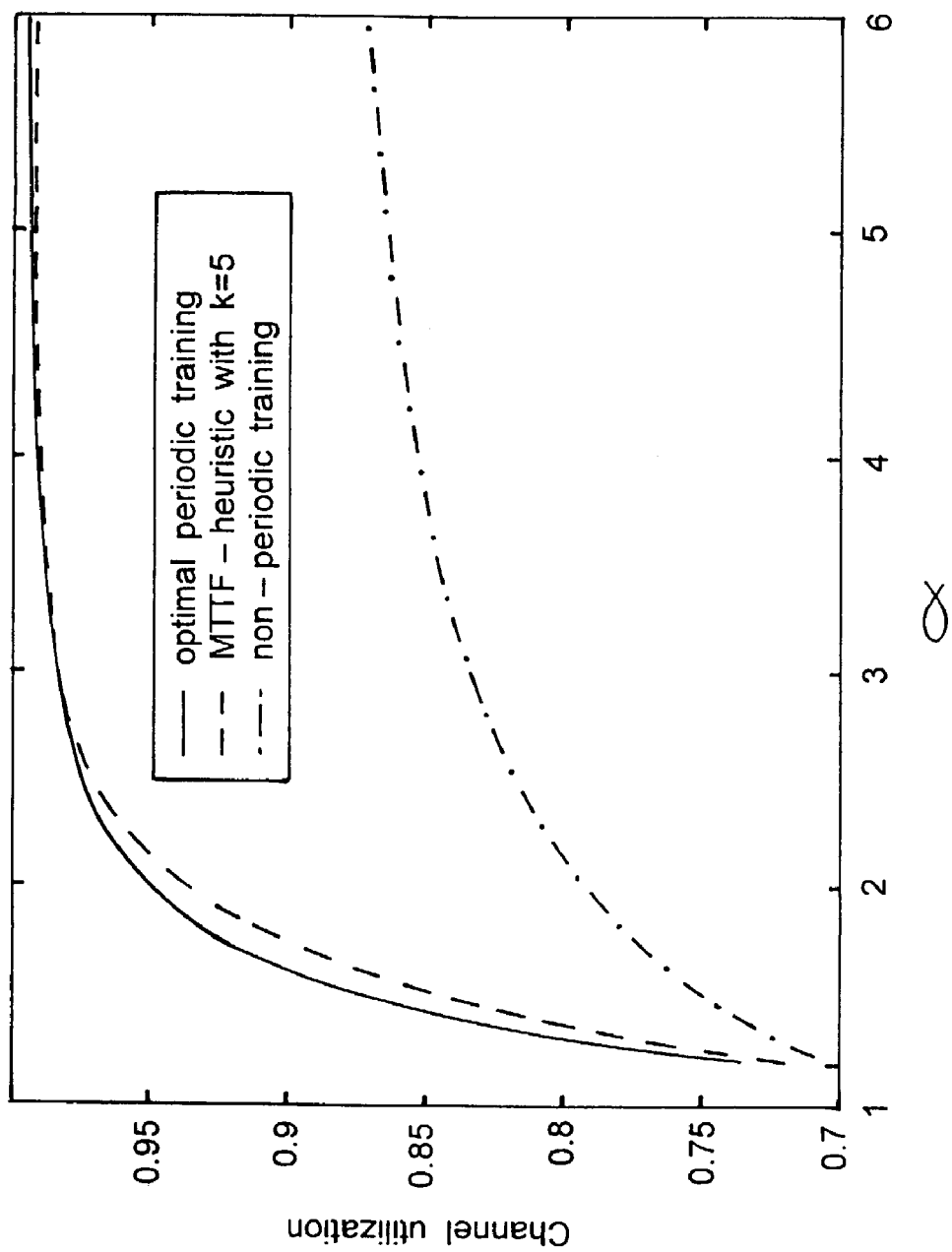
FIG. 11 is a graph illustrating the channel utilization corresponding to selected optimal training schemes with respect to a variable α.

To compare these schemes, Weibull distribution is assumed for the equalizer failure time, with $\alpha$ varied from 1.2 to 6 and $\lambda=5$. Referring to FIG. 11, a graph is shown that illustrates the channel utilization corresponding to these schemes with respect to $\alpha$. It is noted that the channel utilization of the optimal scheme is significantly better than the non-periodic training equalization scheme, while the performance of heuristic MTTF scheme approaches the optimal result.

The disadvantage of the MTTF-heuristic scheme is that its performance is dependent on the value of k. Although k=5 may be a good choice for Weibull distributed failure time, this is not always the case for other failure time distributions. Therefore, this class of schemes is dependent on a priori distribution information, e.g., the type of distributions. In this sense, the non-parametrical statistical estimation algorithm is better than the heuristic scheme in its independence of distribution information.

It will be understood that various details of the invention may be changed without departing from the scope of the invention. Furthermore, the foregoing description is for the purpose of illustration only, and not for the purpose of limitation.

What is claimed is:

1. A method for determining an optimal training interval for a channel of a communications system, the method comprising:
   (a) receiving first channel estimations of a signal carried by a channel of a communications system, wherein the first channel estimations are generated by a first channel estimator, and wherein the communications system includes a normal mode for utilizing the channel to carry user data, a training mode for training the first channel estimator, and a failure mode for recovering channel communication after channel failure;

(b) determining a time distribution of the channel transition from the normal mode to the failure mode, wherein channel failure occurs when error in the first channel estimations exceeds a first predetermined threshold; and (c) applying Markovian analysis to the time distribution of the channel transition to determine a first training interval for training the first channel estimator such that channel utilization in the normal mode is maximized.

2. The method of claim 1 further including receiving second channel estimations of the signal from a second channel estimator, wherein the second channel estimator is not trained in the training mode, and wherein channel failure occurs when the error between the first and second channel estimations exceeds the first predetermined threshold.

3. The method of claim 2 wherein channel failure occurs when the mean squared error between the first and second channel estimations exceeds the first predetermined threshold.

4. The method of claim 2 further including setting parameters of the second channel estimator to parameters of the first channel estimator when channel failure occurs.

5. The method of claim 1 wherein the channel failure occurs when the bit error rate of the channel is greater than a second predetermined threshold.

6. The method of claim 1 wherein determining a time distribution of the channel in the failure mode further includes determining time elapsing between channel failures.

7. The method of claim 6 wherein determining time elapsing between channel failures includes resetting a timer after an initial channel failure and recording the time on the timer at the next channel failure.

8. The method of claim 1 wherein determining a time distribution of the channel in the failure mode includes obtaining a predetermined number of channel failure times.

9. The method of claim 8 wherein the predetermined number of channel failure times is between 50 and 100.

10. The method of claim 1 wherein determining a time distribution of the channel in the failure mode include storing the time periods between each channel failure in a memory.

11. The method of claim 10 wherein the time periods are placed in order in the memory according to the length of the time period.

12. The method of claim 11 further including determining a scaled total time on test statistic on the time periods stored in the memory.

13. The method of claim 12 wherein the scaled total time on test statistic is determined with the following equation:

$$\Phi_j = \sum_{k=1}^{j} x_k + (n-j)x_j,$$

wherein n represents the number of channel failure times, k represents the position of the failure time in order in the memory, and $x_k$ represents the kth smallest failure time in the memory.

14. The method of claim 13 wherein the first training interval is determined with the following equation:

$$x_j = \max\left\{ j \,\Big|\, \max_{0 \le j \le n} \frac{\phi_{nj}}{j/n + t_1/t_2} \right\},$$

wherein $x_j$ converges to the first training interval as n goes to infinity, $t_1$ represents a first time period required for training the first channel estimator in the training mode, and $t_2$ represents a second time period required for recovering channel communication in the failure mode.

15. The method of claim 1 further including updating a transmitter for the channel with the first training interval.

16. The method of claim 1 wherein the first channel estimator is trained in the training mode at a second training interval before the step of applying Markovian analysis.

17. The method of claim 16 wherein the first channel estimator is trained in the training mode at the first training interval after the step of applying Markovian analysis.

18. A method for determining an optimal training interval for a channel of a communications system, the method comprising:

(a) receiving first channel estimations of a signal carried by a channel of a communications system, wherein the first channel estimations are generated by a first channel estimator, and wherein the communications system includes a normal mode for utilizing the channel to carry user data, a training mode for training the first channel estimator, and failure mode for recovering channel communication after channel failure;

(b) receiving second channel estimations of the signal from a second channel estimator, wherein the second channel estimator is not trained in the training mode;

(c) determining a time distribution of the channel transition from the normal mode to the failure mode, wherein channel failure occurs when error between the first and second channel estimations a first predetermined threshold; and (d) applying Markovian analysis to the time distribution of the channel transition to determine a first training interval such that channel utilization in the normal mode is maximized.

19. The method of claim 18 wherein the channel failure occurs when the bit error rate of the channel is greater than a second predetermined threshold.

20. A method for determining an optimal training interval for a channel of a communications system, the method comprising:

(a) receiving first channel estimations of a signal carried by a channel of a communications system, wherein the first channel estimations are generated by a first channel estimator, and wherein the communications system includes a normal mode for utilizing the channel to carry user data, a training mode for training the first channel estimator, and a failure mode for recovering channel communication after channel failure;

(b) determining a failure time distribution of the channel transition from the normal mode to the failure mode, wherein the channel failure occurs when error in the first channel estimations exceeds a first predetermined threshold, wherein the failure time distribution includes a predetermined number n of channel failure times;

(c) determining a scaled total time on test statistic with the following equation:

$$\Phi_j = \sum_{k=1}^{j} x_k + (n-j)x_j,$$

wherein n represents the predetermined number of channel failure times, k represents the position of the failure time in an ordered sequence, and $x_k$ represents the kth smallest failure time in the ordered sequence; and (d) determining a first training interval with the following equation:

$$x_j = \max\left\{ j \left| \max_{0 \le j \le n} \frac{\phi_{nj}}{j/n + t_1/t_2} \right. \right\},$$

wherein $x_j$ converges to the first training interval as n goes to infinity, $t_1$ represents a first time period required for training the first channel estimator in the training mode, and $t_2$ represents a second time period required for recovering channel communication in the failure mode.

21. A system for determining an optimal training interval for a channel of a communications system, the system comprising:
(a) a first channel estimator connected to a channel of a communications system for generating first channel estimations of a signal carried by the channel, wherein the first channel estimations are generated by a first channel estimator, and wherein the communications system includes a normal mode for utilizing the channel to carry user data, a training mode for training a first channel estimator, and a failure mode for recovering channel communication after channel failure;
(b) a mode monitor for determining time distribution of the channel transition from the normal mode to the failure mode, wherein channel failure occurs when error in the first channel estimations exceed a first predetermined threshold; and
(c) a training interval estimator for applying Markovian analysis to the time distribution of the channel transition to determine a first training interval such that channel utilization in the normal mode is maximized.

22. The system of claim 21 further including a second channel estimator connected to the channel for generating second channel estimations of the signal, wherein the second channel estimator is not trained in the training mode, and wherein channel failure occurs when the error between the first and second channel estimations exceeds the first predetermined threshold.

23. The system of claim 22 wherein channel failure occurs when the mean squared error between the first and second channel estimations exceeds the first predetermined threshold.

24. The system of claim 22 wherein parameters of the second channel estimator set to parameters of the first channel estimator when channel failure occurs.

25. The system of claim 21 wherein the channel failure occurs when the bit error rate of the channel is greater than a second predetermined threshold.

26. The system of claim 21 wherein the mode monitor obtains a predetermined number of channel failure times.

27. The system of claim 21 wherein the predetermined number of channel failure times is between 50 and 100.

28. The system of claim 21 further including a memory for storing the time periods between each channel failure.

29. The system of claim 28 wherein the time periods are placed in order in the memory according to the length of the time period.

30. The system of claim 29 wherein the training interval estimator determines a scaled total time on test statistic on the time periods in the memory.

31. The system of claim 30 wherein the scaled total time on test statistic is determined with the following equation:

$$\Phi_j = \sum_{k=1}^{j} x_k + (n-j)x_j,$$

wherein n represents the number of channel failure times, k represents the position of the failure time in order in the memory, and $x_k$ represents the kth smallest failure time in the memory.

32. The system of claim 31 wherein the training interval estimator uses the following equation to determine the first training interval:

$$x_j = \max\left\{ j | \max_{0 \le j \le n} \frac{\phi_{nj}}{j/n + t_1/t_2} \right\},$$

wherein $x_j$ converges to the first training interval as n goes to infinity, $t_1$ represents a first time period required for training the first channel estimator in the training mode, and $t_2$ represents a second time period required for recovering channel communication in the failure mode.

33. The system of claim 21 wherein the first channel estimator is trained in the training mode at a second training interval before the training interval estimator applies Markovian analysis.

34. The system of claim 33 wherein the first channel estimator is trained in the training mode at the first training interval after the training interval estimator applies Markovian analysis.

35. A computer-readable medium having stored thereon instructions for determining an optimal training interval for a channel of a communications system, comprising:
(a) receiving first channel estimations of a signal carried by a channel of a communications system, wherein the first channel estimations are generated by a first channel estimator, and wherein the communications system includes a normal mode for utilizing the channel to carry user data, a training mode for training the first channel estimator, and a failure mode for recovering channel communication after channel failure;
(b) determining a time distribution of the channel transition from the normal mode to the failure mode, wherein channel failure occurs when error in the first channel estimations exceeds a first predetermined threshold; and (c) applying Markovian analysis to the time distribution of the channel transition to determine a first training interval such that channel utilization in the normal mode is maximized.

36. The computer-readable medium according to claim 35 further including receiving second channel estimations of the signal from a second channel estimator, wherein the second channel estimator is not trained in the training mode, and wherein channel failure occurs when the error between the first and second channel estimations exceeds the first predetermined threshold.

37. The computer-readable medium according to claim 36 wherein channel failure occurs when the mean squared error between the first and second channel estimations exceeds the first predetermined threshold.

38. The computer-readable medium according to claim 37 further including setting parameters of the second channel estimator to parameters of the first channel estimator when channel failure occurs.

* * * * *